(12) United States Patent
Baughman et al.

(10) Patent No.: US 10,114,890 B2
(45) Date of Patent: Oct. 30, 2018

(54) GOAL BASED CONVERSATIONAL SERENDIPITY INCLUSION

(71) Applicant: International Business Machines Corporation, Armonk, NY (US)

(72) Inventors: Aaron K. Baughman, Silver Spring, MD (US); Wendy A. Kellogg, Solana Beach, CA (US); James R. Kozloski, New Fairfield, CT (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 14/788,156

(22) Filed: Jun. 30, 2015

(65) Prior Publication Data

US 2017/0004207 A1    Jan. 5, 2017

(51) Int. Cl.
*G06F 17/30* (2006.01)
(52) U.S. Cl.
CPC .............. *G06F 17/30705* (2013.01)
(58) Field of Classification Search
CPC ................................................ G06F 17/30705
See application file for complete search history.

(56) References Cited

U.S. PATENT DOCUMENTS

| | | | |
|---|---|---|---|
| 6,321,221 B1 | 11/2001 | Bieganski | |
| 7,627,588 B1 | 12/2009 | Mohan et al. | |
| 7,831,427 B2 | 11/2010 | Potter et al. | |
| 8,296,152 B2 * | 10/2012 | Issa | G06Q 10/10 379/201.01 |
| 9,082,232 B2 | 7/2015 | Evans | |
| 2005/0090981 A1 | 4/2005 | Gaegauf | |
| 2005/0114449 A1 * | 5/2005 | Verhaeghe | G06Q 10/10 709/204 |
| 2009/0112985 A1 * | 4/2009 | Quinn | G06Q 10/00 709/204 |
| 2010/0010844 A1 | 1/2010 | Isaksen | |
| 2010/0211566 A1 | 8/2010 | Ghanekar | |
| 2011/0179114 A1 * | 7/2011 | Dilip | G06F 17/30867 709/204 |

(Continued)

FOREIGN PATENT DOCUMENTS

WO    2013041517    9/2012

OTHER PUBLICATIONS

Bergstrom et al., Conversation Clusters: Grouping Conversation Topics Through Human-Computer Dialog, Apr. 4-9, 2009, http://dl.acm.org/citation.cfm?id=1519060, pp. 2349-2352.*

(Continued)

*Primary Examiner* — Jorge A Casanova
(74) *Attorney, Agent, or Firm* — Rahan Uddin; Otterstedt, Ellenbogen & Kammer, LLP

(57) ABSTRACT

A method for injecting information into a deliberation includes extracting at least one concept from a plurality of statements asserted by at least one participant of a group, correlating the at least one concept to a goal of the deliberation, tagging at least one of the plurality of statements with an identifier of a participant who asserted the statement, clustering a plurality of participants of the group according to a slant on each of the at least one concept, searching, using the at least one concept, tagged statements and a cluster of participants, for new information or concepts that negate at least one slant that is not in agreement with the goal, and injecting the new information into the deliberation.

16 Claims, 7 Drawing Sheets

(56) References Cited

U.S. PATENT DOCUMENTS

| | | | |
|---|---|---|---|
| 2012/0254184 A1* | 10/2012 | Choudhary | G06Q 50/01 707/738 |
| 2013/0297582 A1* | 11/2013 | Zukovsky | G06F 17/30867 707/706 |
| 2014/0025692 A1 | 1/2014 | Pappas | |
| 2014/0188997 A1* | 7/2014 | Schneiderman | H04L 51/32 709/204 |
| 2015/0100520 A1* | 4/2015 | McDonald | G06N 5/02 706/11 |
| 2015/0178388 A1* | 6/2015 | Winnemoeller | G06F 17/30864 707/722 |

OTHER PUBLICATIONS

Valentina Maccatrozzo, Burst the Filter Bubble: Using Semantic Web to Enable Serendipity, ISWC'12 Proceedings of the 11th international conference on The Semantic Web—vol. Part II, Nov. 11, 2012, pp. 391-398.

Zhe Wang et al., Reading Tweeting Minds: Real-time Analysis of Short Text for Computational Social Science, 24th ACM Conference on Hypertext and Social Media, May 1-3, 2013, Paris, France, pp. 1-5.

Mei Wang et al., Automatic Image Annotation via Local Multi-Label Classification, CIVR '08, Niagara Falls, Canada, Jul. 7, 2008, pp. 1-10.

Francesco Di Maio, et al., Ensemble-approaches for clustering health status of oil sand pumps. Expert Systems with Applications, Elsevier, Jul. 26 2012, 39 (5), pp. 4847-4859.

George Christodoulou et al., The Role of Twitter in YouTube Videos Diusion, WISE'12: Proceedings of the 13th international conference on Web Information Systems Engineering, Nov. 2012, pp. 1-14.

* cited by examiner

GOAL BASED CONVERSATIONAL SERENDIPITY INCLUSION

BACKGROUND

The present disclosure relates to assistive technology, and more particularly to assistive technology injecting information, extracted through information cascading, into a deliberation.

Recommendation engines make inferences on existing data to discover relationships between objects, such as users, items, products, and so on. The relationships between objects provide a degree of likeness. For example, a recommendation engines can be tasked with discovering product recommendations for a customer, to deliver dynamic personalized shopping recommendations across web, mobile and email channels. These product recommendations can be automatically generated based on the customer's unique attributes, past purchases, current and historical shopping behaviors, and business rules.

In another application, a recommendation engine can be tasked to digital analytics, recommending updates to web sites, social media channels, etc. in a combined advertisement campaign.

BRIEF SUMMARY

According to an exemplary embodiment of the present invention, a method for injecting information into a deliberation includes extracting at least one concept from a plurality of statements asserted by at least one participant of a group, correlating the at least one concept to a goal of the deliberation, tagging at least one of the plurality of statements with an identifier of a participant who asserted the statement, clustering a plurality of participants of the group according to a slant on each of the at least one concept, searching, using the at least one concept, tagged statements and a cluster of participants, for new information or concepts that negate at least one slant that is not in agreement with the goal, and injecting the new information into the deliberation.

According to an exemplary embodiment of the present invention, a meeting assistant system injecting information into a deliberation includes an input module configured to extract at least one concept from a plurality of statements asserted by at least one participant of a group, a correlation module configured to correlate the at least one concept to a goal of the deliberation, a tagging module configured to tag at least one of the plurality of statements with an identifier of a participant who asserted the statement, a clustering module configured to cluster a plurality of participants of the group according to a slant on each of the at least one concept, a retrieval system configured to search, using the at least one concept, tagged statements and a cluster of participants, for new information or concepts that negate at least one slant that is not in agreement with the goal, and an injector module configured to inject the new information into the deliberation.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
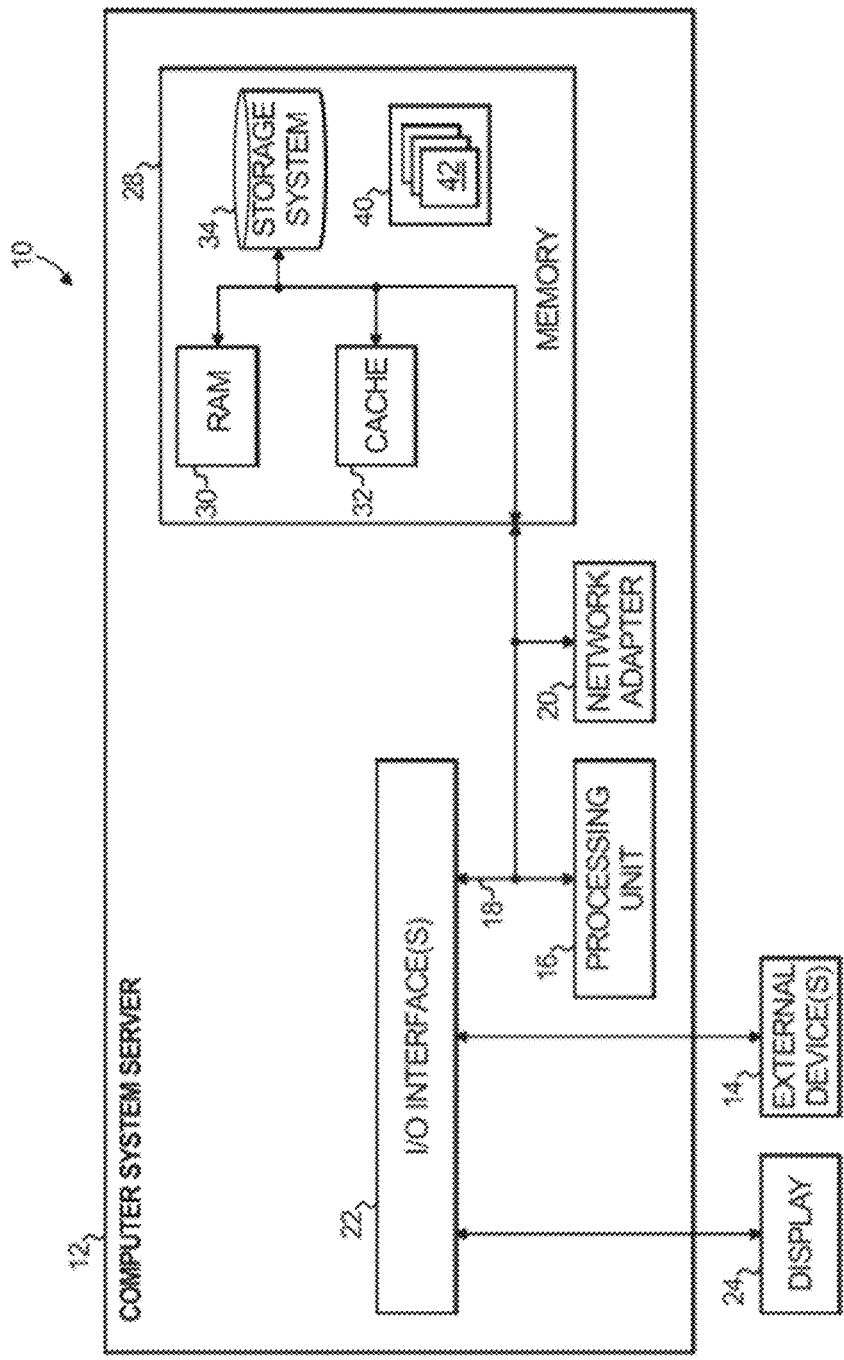
FIG. 1 depicts a cloud computing node according to an embodiment of the present invention.

According to an exemplary embodiment of the present invention, group deliberations are annealed toward a goal by information cascading engineering. Information cascading engineering injects information into a deliberative system in the form of knowledge or cues.

Groups of decision makers are formed for a wide variety of tasks and in any number of fields. These fields can include finance, marketing, healthcare, sales, planning, etc. Exemplary embodiments of the present invention have applications in assisting financial analysts to select an investment strategy, helping physicians to determining a suitable treatment for a given patient, etc.

According to an embodiment of the present invention, deliberations within a group are guided by an end state. The end state is a goal or opinion that the group should attain at the end of the deliberations (e.g., a selection of one alternative to the exclusion of one or more other alternatives). During the deliberations, the group participants become more confident and unified by decreasing the range of views (e.g., alternatives) considered be the group and promoting uniformity, typically adopting information that is known and that is common among a majority of the participants. This information tends to seen as more relevant, and therefore progresses within the deliberation. The aggregation of information leads the group to unite.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
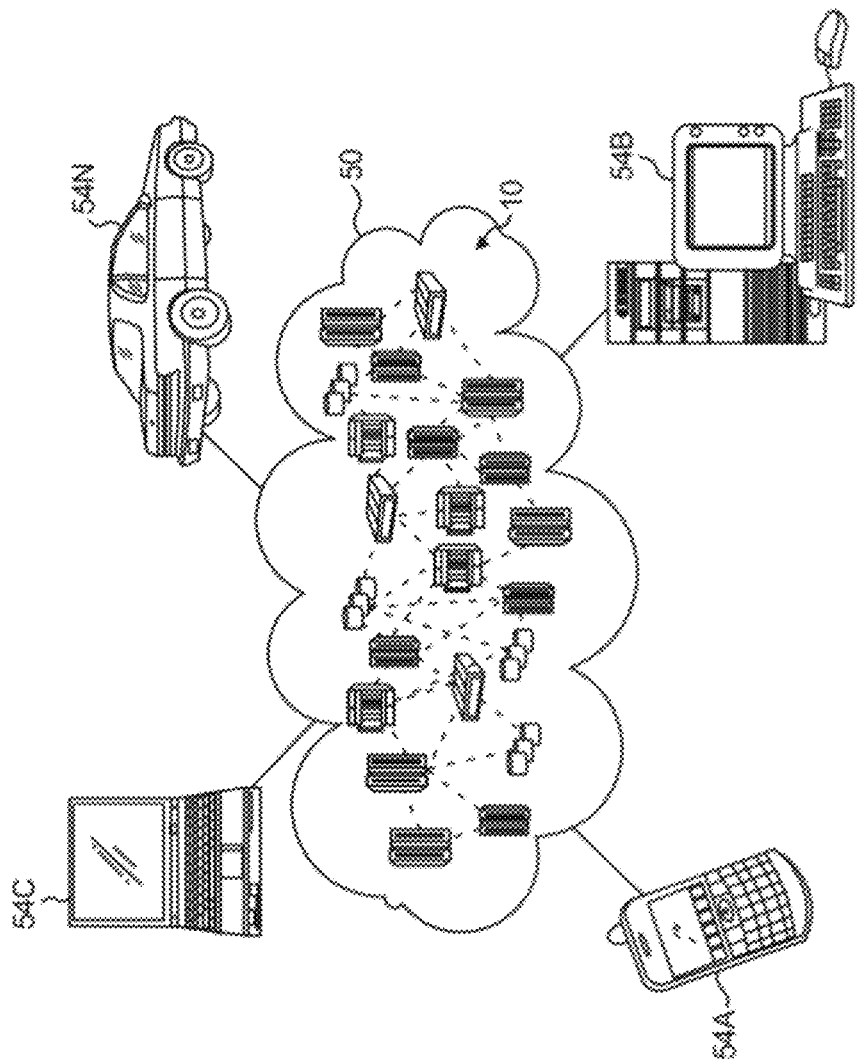
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
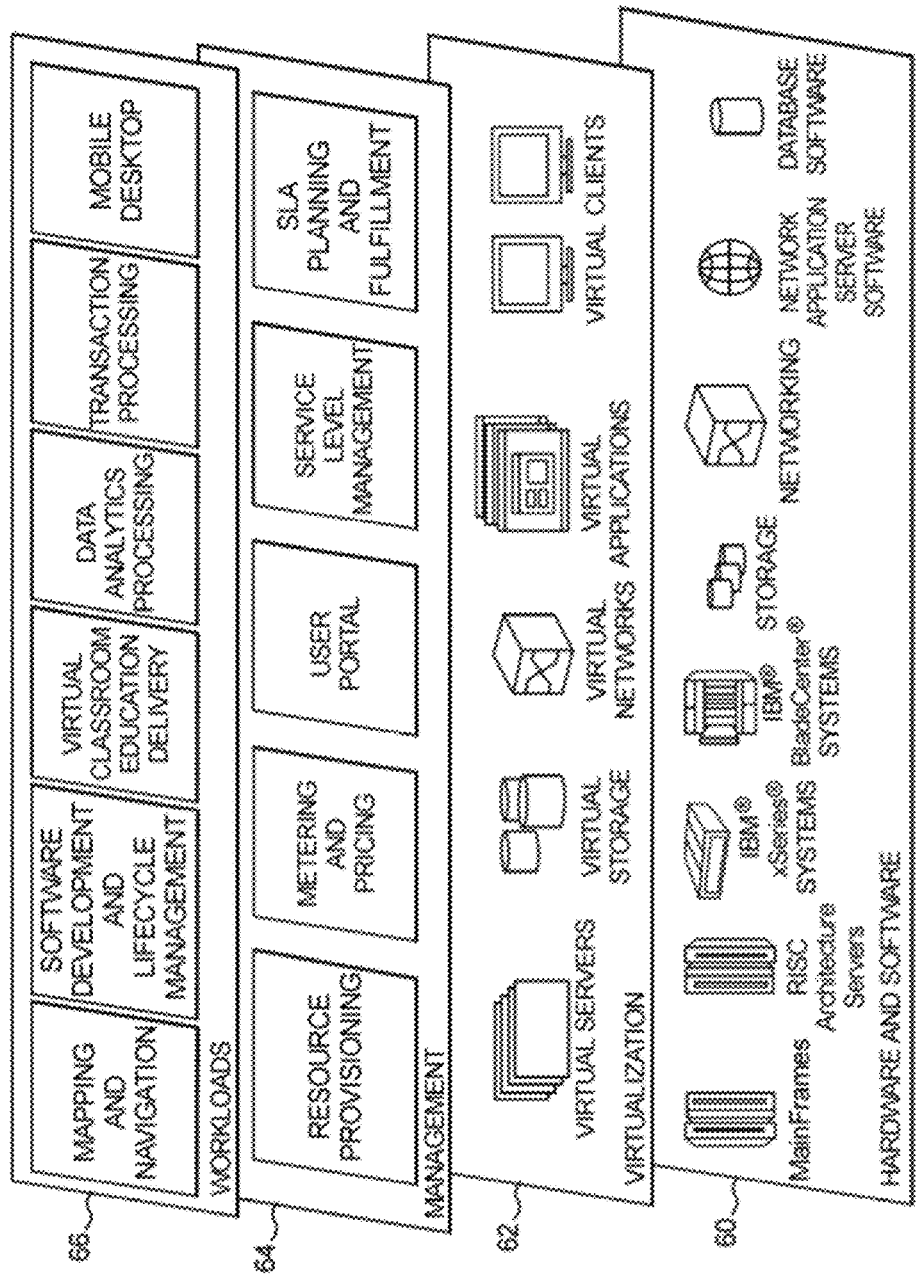
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

According to an exemplary embodiment of the present invention, information cascading engineering injects different types of knowledge, which is determined to be potentially impactful, into a deliberative system to anneal a group towards an a priori goal (e.g., consensus). In one example, orthogonal (e.g., a direction, issue or topic that has not been considered) information that is not formed between participants of the group is injected into the deliberations. Orthogonality refers to independence in topic statistics, and is not intended to imply irrelevance to, or negation of, the meeting topic. For example, a topic space for a meeting can include regions of a multi-dimensional space not represented by group participants. Orthogonality in this case refers to a direction in the topic space of the meeting that is independent of all the other topic vectors of the group participants, but still within the meeting topic space. According to an exemplary embodiment of the present invention, other information correlated to the end state, and that is known by less than all of the group participants, is injected into the deliberative process. Thus, in one or more embodiments of the present invention, knowledge that is correlated to the goal is maintained during the deliberations.

According to an exemplary embodiment of the present invention, the "end state" refers to the purpose of the meeting, and does not imply a decision state. Consider a meeting where a choice to be made as a result of the meeting is not fully divulged to participants, for example, a choice between options A and B. The meeting may first explore options A, B, C, and D, while knowledge correlated to the end state may be information relevant to only A or B.

Figure 4:
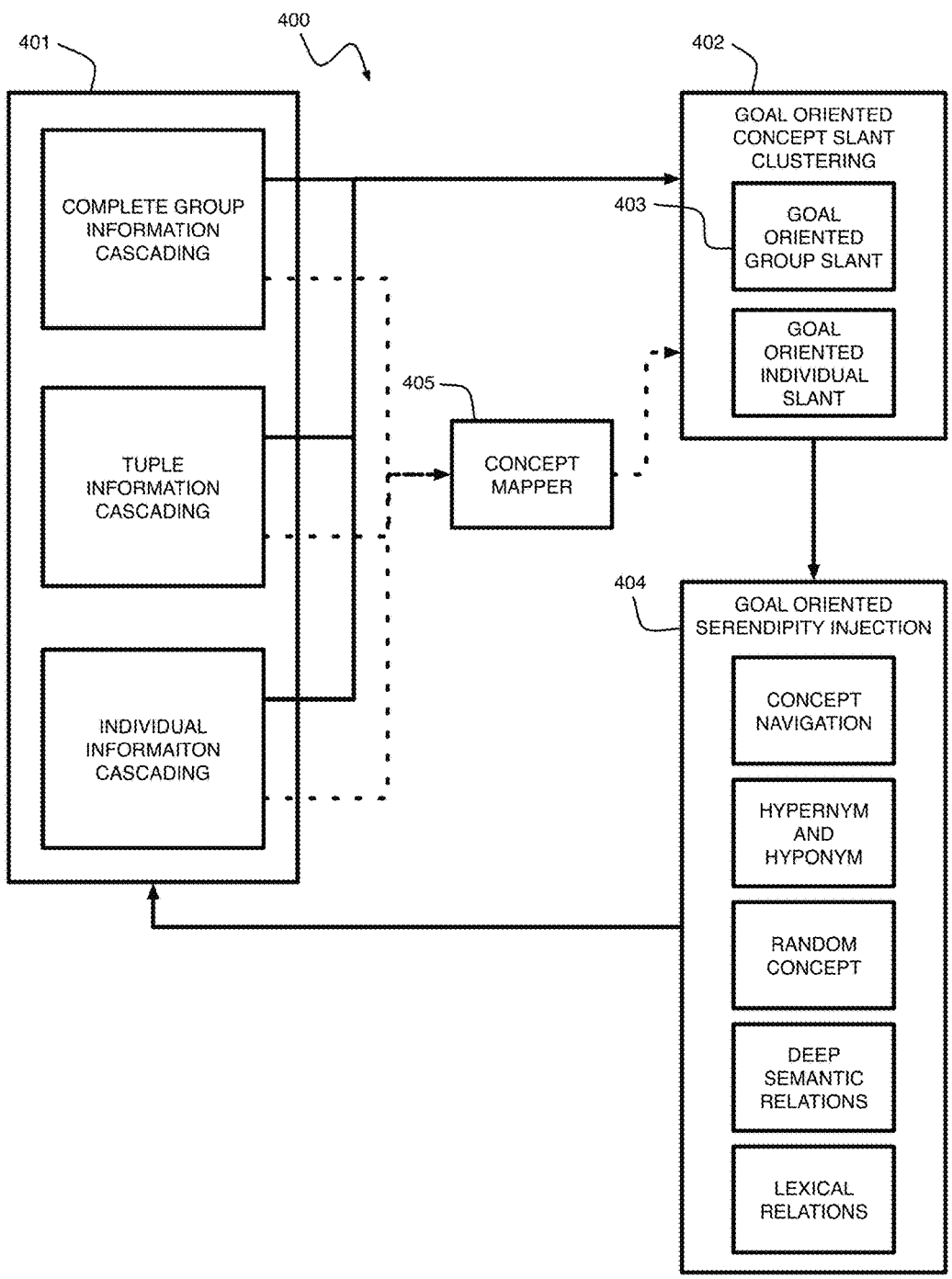
FIG. 4 is a flow diagram of a method of a recommendation engine according to an exemplary embodiment of the present invention.

Referring to FIG. 4, a method for goal oriented cascading information engineering 400 includes extracting salient concepts 401, during deliberations or at decision points within a group, that summarize the deliberations and that are correlated with the goal or desired outcome.

According to one or more embodiments of the present invention, salient concepts are identified from the corpus of meeting participants' speech and text inputs, identified in the previous step as relevant to A or B. In one or more embodiments of the present invention, the relevance and usefulness of the information is assessed prior to injection into the deliberative system. It should be understood that concepts can be mapped into a larger topic space using topic mapping, such as Latent Dirichlet allocation (LDA).

According to an embodiment of the present invention, the extracted concepts are transformed into digital content, the digital content being used to control the capabilities of an electronic meeting assistant. In one or more embodiments of the present invention, the digital content is used to determine a rate of injection for new information. For example, the system schedules a next injection of information including a new concept in five minutes. In another example, the system injects a new concept once a degree of negation for a certain participant's sentiment reaches a threshold (e.g., a degree of negation, which is a number determined between 0 and 1, is greater than 0.15). Exemplary methods for determining the degree of negation are described herein.

According to one or more embodiments of the present invention, the conversation information cascades are streamed, in parallel, to the goal oriented slant clustering 402. For example, the corpus of meeting participants' speech and text inputs are analyzed for relevance to concepts A and B, by means of clustering, and by associating a valence with the topic reference. In this example, a mention of concept A is aggregated and noted, and assigned to the cluster "in support of A" or "in opposition to A." According to an exemplary embodiment of the present invention, a participant's sentiment is their own view about a concept being deliberated, for example, a given participant is determined to support concept A as determined from the speech and text input attributed to the given participant.

According to one or more embodiments of the present invention, each participant's sentiment about an extracted concept is measured, yielding group, tuple, and individual goal oriented slants, e.g., 403. According to one or embodiments of the present invention, the measurement of sentiment can be performed by determining the number of times support or opposition is voiced (e.g., determining a number of times different negation words (e.g., words used in opposition to a concept supported by a participant) are present in a conversation), the use of emphasis words such as interjections, adjectives, and adverbs, the tonal qualities of voice indicating emotion, and a signal indicative of heart rate received from a wearable device, respiration rate, and eye blinks, indicating the level of sentiment. It should be understood that other methods of sentiment measurement are possible.

According to one or more embodiments of the present invention, the slant annotations are pushed to a serendipity pipeline 404 that generates concepts that are related to the goal 405.

According to an embodiment of the present invention, a concept refers to a topic feature, and its relationship to a participant's sentiment. According to another embodiment of the present invention, a concept also refers to relationships between topics and reason(s) for a participant's sentiment. Participant speech and text inputs are decomposed by applying a set of analytics, shown in 404, in one of all possible orderings to create a pipeline. These pipelines are evaluated for the usefulness of the features they create, where a feature is a representation of a concept in a multi-dimensional space. Features can be used for the categorization of slant and meeting topic states.

Figure 5:
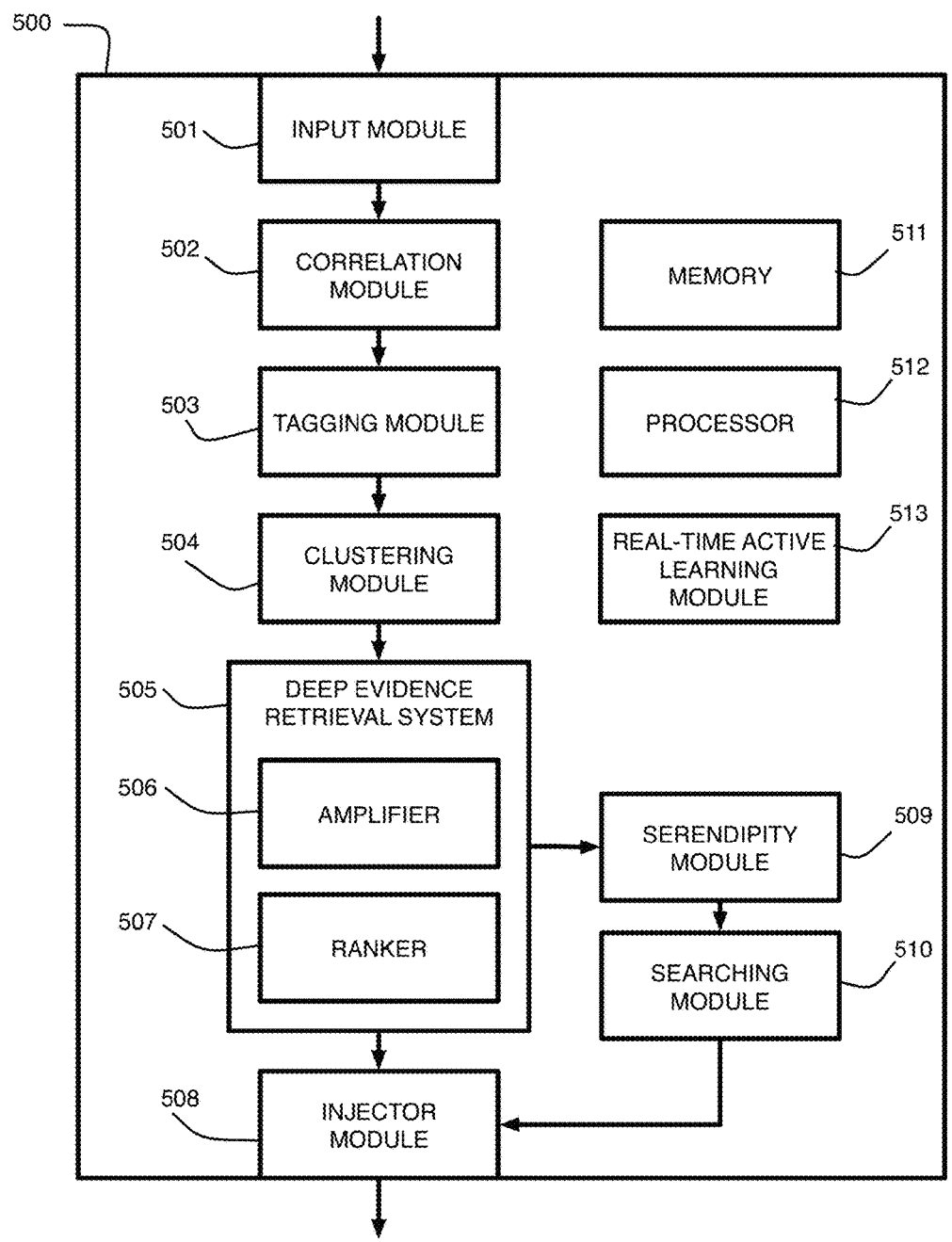
FIG. 5 is a system embodying assistive technology (AT) injecting information, extracted through information cascading, into a deliberation according to an exemplary embodiment of the present invention.

The serendipity information is streamed into each of the information cascades that effectively engineers a new information cascade for an individual, tuple of individuals or the entire group 401. According to one or more embodiments of the present invention, the information is injected using a display specifically designated for an electronic meeting assistant (e.g., see electronic meeting assistant 500, FIG. 5) input. In one or more embodiments, of the present invention, the information is presented in a format that draws the attention of the meeting participants, e.g., using different typography. In at least one embodiment of the present invention, the electronic meeting assistant uses sound (e.g., a tone) when a new piece of information is injected into the meeting. In this way, the meeting participants may pause, read the text input on the screen, discuss the suggested information, and proceed. In this way, the assistant becomes an expected and useful contributor to the meeting.

According to an exemplary embodiment of the present invention, goal oriented cascading information engineering moves the group or groups toward a unanimous opinion that supports the goal. Unanimity as a target meeting state ensures the system explores the space of alternate goals and/or opinions fully, and that an outcome (e.g., a decision) will be acceptable to the group. Note that the electronic meeting assistant does not impose a specific decision, but guides the meeting towards a goal (e.g., unanimity). The rate of information flow, as well as other influences such as opinions, rhetoric, and body language, creates enhanced and pervasive corroboration as the participants take a side (e.g., of an issue).

According to an exemplary embodiment of the present invention, a group or groups is/are annealed toward a goal by information cascading engineering injecting knowledge or cues into the deliberations. One or more embodiments of the present invention, support unanimity as a targeted end state for the meeting that correlates with the goal or decision point. At least one embodiment of the present invention promotes influence based homophily and promotes curiosity about a specific idea within a group. One or more embodiments of the present invention include engineered conversational cascades. At least one embodiment of the present invention reduces amplification error during deliberations by reducing reliance on the availability heuristic or the information available to group participants.

According to an exemplary embodiment of the present invention, information cascades are engineered within a group to achieve a goal. The discovery of knowledge by the group is serendipitously injected into deliberations by the electronic meeting assistant. Such goal oriented surprises, or finding a new idea while not specifically looking for one, is known as serendipity. Surprise in an information theoretic sense includes a human measure of information content. Therefore, more informative statements are more surprising. Information contained in a message can also be quantified by the statistical independence of the statement from other statements in the ensemble. Therefore, as used herein, serendipity is related to the principles of maximum information, and the electronic meeting assistant system's search for topic inputs orthogonal to other participants' within a meeting's topic space.

According to an exemplary embodiment of the present invention, an electronic meeting assistant system 500 includes an input module 501 taking one or more conversations about a deliberation as input. The input module 501 is configured to extract concepts from the corpus of meeting participants' speech and text inputs related to the deliberations. It should be understood that these inputs can be extracted during the meeting or from relevant materials made available before the meeting (e.g., a meeting agenda, notes sent before the meeting, etc.). In at least one embodiment of the present invention, the input module 501 includes a speech-to-text converter, wherein the system converts meeting participants' speech into text for analysis.

According to at least one embodiment of the present invention, a correlation module 502 correlates the extracted concepts to a goal of the deliberation. If, for example, the goal is a decision between A and B, the module can track progress towards unanimity on this decision by keeping a "score" of how many participants are likely to support A vs. B. More particularly, in at least one example, a participant is determined to support concept A according to an analysis that reveals that at least 40% of the participant's speech and text input (e.g., words or phrases attributed to the participant) support concept A. It should be understood that other ratios can be used as a threshold to determine support or opposition (e.g., negation) to a concept. In at least one embodiment, the analysis includes determining a magnitude of negation attributed to a given word according a concept that it is negating (e.g., using key words determined to be relevant to a particular concept or deliberation, and semantic analysis to determine it is relevant in the context of negating the concept). Relevance between concepts is well known in the art, and can be measured by topic analysis techniques such as Latent Dirichlet allocation (LDA). Relevance between words is also well known in the art and can be measured by distance between words within a lexical database such as WordNet. Negation detection in text is also known in the art, by use of such specialized lexical scanners such as NegFinder.

According to an exemplary embodiment of the present invention, a tagging module 503 tags statements within the deliberations with a participant who asserted the statement. A clustering module 504 clusters participants (into clusters) based on a slant on one or more of the extracted concepts. Slant refers to the salience of the sentiment revealed by a participant's input, either for or against, a specific topic indicated decision (e.g., A vs. B). That is, participants that agree/conform to a concept are clustered in a first cluster and participants that disagree/diverge from the concept are clustered in a second clusters.

According to one or more embodiments of the present invention, a deep evidence retrieval system 505 receives each concept, together with source participant(s) and clustering slants and searches for new information or concepts to negate one or more slants that are not in agreement with the goal. According to an exemplary embodiment of the present invention, the deep evidence retrieval system 505 includes an amplifier 506 amplifying information or concepts that support the goal, and a ranker 507 ranking a salience of concepts or information (old or new) based on the support of the goal. The deep evidence retrieval system 505 injects salient concepts that agree with the goal or information (old or new) to the meeting, or to subgroups derived from the clustered groups. To present to one subgroup or another, a set of communication links to personal or group specific displays can be employed.

Figure 6:
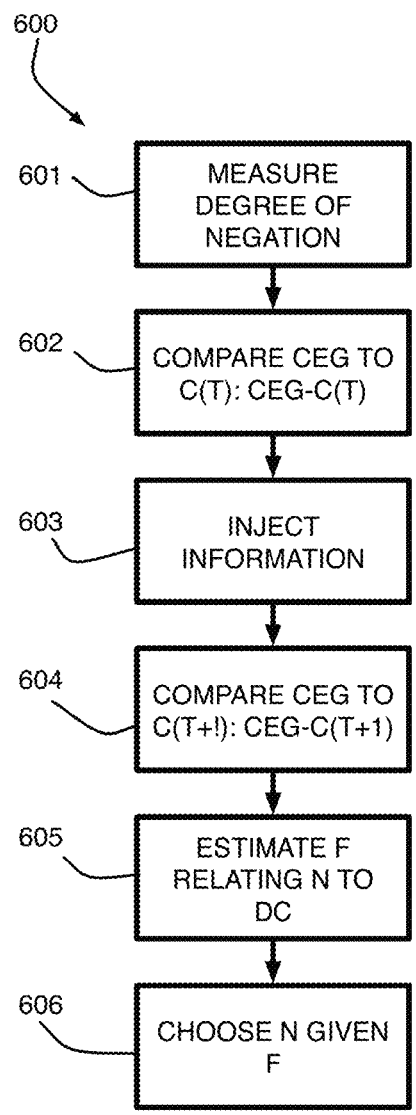
FIG. 6, a method of controlling the rate of presentation according to an exemplary embodiment of the present invention.

According to an exemplary embodiment of the present invention, an injector module 508 presents individualized information (old or new) to each group participant. According to an embodiment of the present invention, a rate of presentation is determined by the degree of negation towards the goal (e.g., how quickly the participants are approaching consensus). The rate of presentation is a measure of how often and/or how much information is injected into a deliberation. For example, referring to FIG. 6, a method of controlling the rate of presentation 600 includes measuring the degree of negation (N) of injected information at 601, comparing a degree of consensus representing an end goal (CEG) to a current degree of consensus (CEG−C(t)) before injection at 602, injecting certain information at 603, comparing the CEG to a current degree of consensus after the injection of the information (CEG−C(t+1)) at 604, estimating a function $f$ relating N to a change degree of consensus over the time interval t (DC): $DC(t+1)=f(DC(t),N)\Delta t$ at 605, and updating the parameters off, N and $\Delta t$ (a time interval in the recurrence relation describing sequence of DC over time) given $f$ in order to reduce (or prevent) oscillations in a consensus (C), and maintain a rate of convergence $\mu$ to the end goal subject to a time constraint. For example, oscillations are controlled using a result of the comparison at block 602 to control the rate of information injection, such that the system does not undermine a direction of the participants' deliberations (e.g., by introducing concepts opposed to a concept relatively favored by the participants). In one or more embodiments, the rate of convergence is a parameter set for an application, and can be given at a discrete value, a threshold minimum value, or a range of values (e.g., some range of $\mu$ between 0 and 1).

According to one or more embodiments of the present invention, a serendipity ranker 509 scores or ranks the serendipity of newly introduced concepts based on correlation to the goal. Referring to the serendipity ranker 509, injected information is tracked for its impact on the goal of unanimity. If, after injecting information (e.g., a newly introduced concept), the score of participants supporting option A vs. B becomes more weighted towards one option or the other, the outcome correlation rank for the introduced concept may be high. The product of the outcome correlation (movement towards unanimity) rank, and the raw statistical measure of serendipity (as described above) is used to create an overall impact score for the newly introduced concept. Note that injected information that has no impact towards unanimity, or low information content, is scored low. Conversely, informative statements that change the relative agreement of the group towards a single option will score high.

According to an exemplary embodiment of the present invention, a searching module 510 searches for serendipity concepts to find more information and to expand the group's knowledge about the idea that supports the goal. According to an embodiment of the present invention, the searching module 510 finds the highest ranked serendipity concept(s).

According to an embodiment of the present invention, social influence can change participant interactions. These social influences can be tracked by various methods. For example, by identifying who has directed information to whom, by means of gaze analysis (e.g., using cameras during the meeting), by analysis of turn taking in speech, and reverse correlation of individual changes in slant relative to previous statements made by other meeting participants. Furthermore, a social network analysis can be used as a prior to the meeting specific analysis. For example, if a participant's statements slant changes after information is injected by a participant of the group, but the information was not provided to the group, for example, due to the information being shared privately by means of instant messaging or email, the information is broadcast to all participants. More particularly, in one or more embodiments of the present invention, participants of a meeting may be divided into groups based on clustering, and the broadcasting of injected information may proceed as follows. Goal-supporting information that results in a slant change of an individual within a group is broadcast to all individuals in that group. Slant changes of an entire group result in the broadcast of goal-supporting information to all groups.

It should be understood that the system 500 includes a memory 511 configured to store, inter alia, the extracted concepts, participants and tagged statements, clustered slants, etc., and a processor 512 configured to execute computer readable program code and implement the methods performed by the system 500.

According to an embodiment of the present invention, the system 500 can periodically question participants during a deliberation to ascertain a slant. In one example, the system 500 determines that a participant has been silent for more than a predetermined period of time and therefore statements are not available to calculate a slant. In at least one embodiment of the present invention, the system 500 includes a real-time active learning module 513 that composes queries to the participants on the perceived value and/or accuracy of past statements, and other indicators of slant such as body language, etc., by the silent participant or other group participants.

By way of recapitulation, according to an exemplary embodiment of the present invention, a method of a system 500 includes a serendipity module 509 configured to score serendipity of newly introduced concepts based on correlation to the goal. In at least one embodiment, the goal is determined using a correlational scorer. As described above, if after injecting information, the score of participants supporting option A vs. B becomes more weighted towards one option or the other, the outcome correlation rank for the statement is high, since the statement is correlated with moving the meeting towards unanimity. In at least one embodiment the clustering module 504 is the goal based concept slant clustering module clustering participants into groups that agree/conform or disagree/diverge from a concept, assigning each concept a slant. According to an embodiment of the present invention, through the injection of information extracted by a deep evidence search (see for example, block 505, FIG. 5) into a deliberation, information cascading engineering can be accomplished.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system (e.g., 500) including an input module 501, a correlation module 502, a tagging module 503, a clustering module 504, a deep evidence retrieval system 505, an injector module 508, a serendipity ranker 509 and a searching module 510. Further, a computer program product can include a tangible computer-readable recordable storage medium with code adapted to be executed to carry out one or more method steps described herein, including the provision of the system with the distinct software modules.

Figure 7:
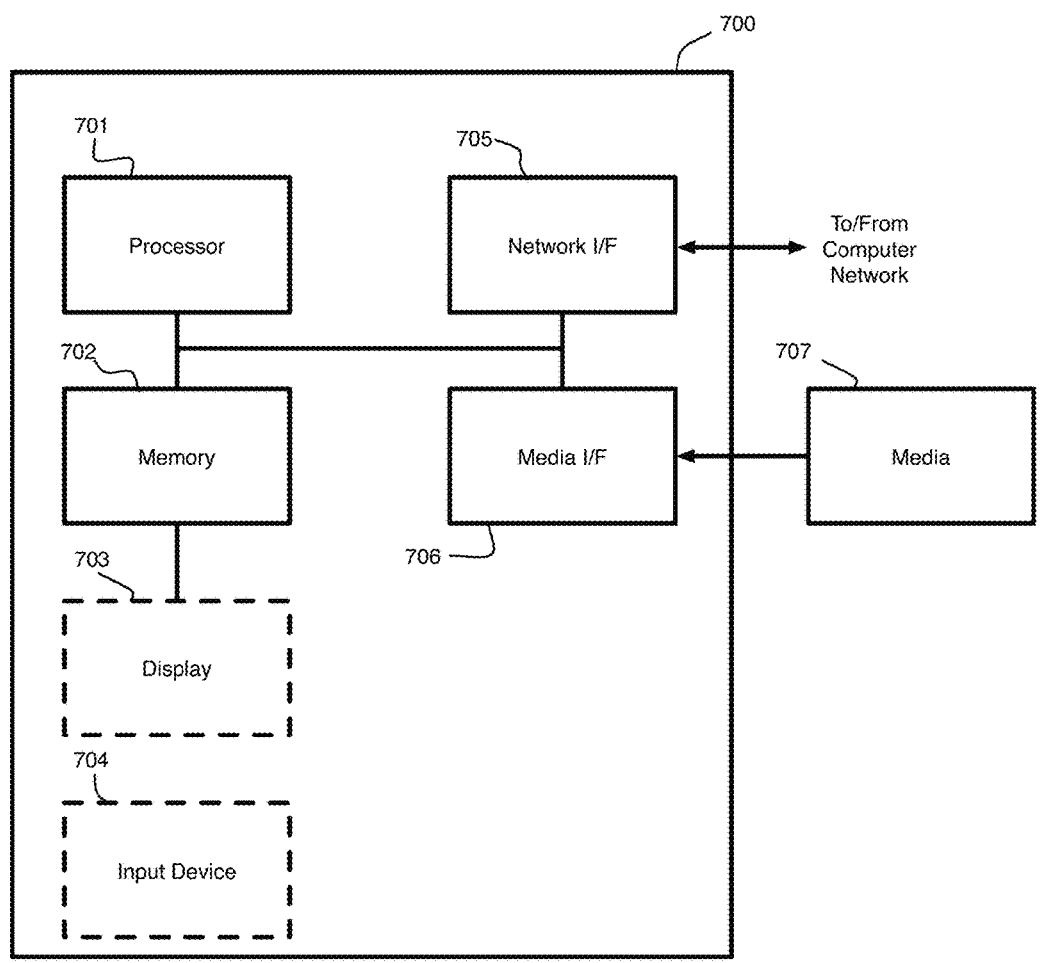
FIG. 7 is a diagram of a computer system configured to inject information, extracted through information cascading, into a deliberation according to an exemplary embodiment of the present invention.

Referring to FIG. 7; FIG. 7 is a block diagram depicting an exemplary computer system (see e.g., FIG. 5, system 500) embodying assistive technology inject information, extracted through information cascading, into a deliberation according to an embodiment of the present invention. The computer system shown in FIG. 7 includes a processor 701, memory 702, display 703, input device 704 (e.g., keyboard), a network interface (I/F) 705, a media I/F 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating an electronic meeting assistant injecting information into a deliberation over time comprising:
    extracting, by an input module of the electronic meeting assistant system, at least one concept from a plurality of statements asserted by at least one participant of a group;
    correlating, by a correlation module of the electronic meeting assistant system, the at least one concept to a goal of the deliberation, wherein the goal is consensus of the group;
    tagging, by a tagging module of the electronic meeting assistant, at least one of the plurality of statements with an identifier of a participant who asserted the statement;
    clustering, by a clustering module of the electronic meeting assistant, a plurality of participants of the group according to a slant on each of the at least one concept;
    searching, by a retrieval system of the electronic meeting assistant, using the at least one concept, the statements tagged by the tagging module and a set of the participants clustered according to a certain slant that is not in agreement with the goal, for new information or concepts that negate the certain slant; and
    injecting, by an injector module of the electronic meeting assistant, the new information into the deliberation at a rate determined by a degree of negation of the new information or concepts towards the goal, wherein the degree of negation is updated after each injection of the new information and wherein the rate of injection is selected to maintain a rate of convergence to the goal.

2. The method of claim 1, wherein the injection is individualized to each group participant.

3. The method of claim 1, wherein searching further comprises amplifying information or concepts that support the goal.

4. The method of claim 1, where searching further comprises ranking a salience of the at least one concept based on the support of the goal.

5. The method of claim 1, where searching further comprises ranking a salience of the new information based on the support of the goal.

6. The method of claim 1, further comprising scoring a serendipity of the new information based on correlation to the goal.

7. The method of claim 6, further comprising searching for a serendipity concept in a topic space based on a measure of orthogonality from a plurality of topics discussed in the deliberation.

8. A computer program product comprising a computer readable storage medium having program instructions embodied therewith, the program instructions executable by a processor to cause the processor to perform a method of operating an electronic meeting assistant injecting information into a deliberation over time comprising:
    extracting at least one concept from a plurality of statements asserted by at least one participant of a group;
    correlating the at least one concept to a goal of the deliberation, wherein the goal is consensus of the group;
    tagging at least one of the plurality of statements with an identifier of a participant who asserted the statement;
    clustering a plurality of participants of the group according to a slant on each of the at least one concept;
    searching, using the at least one concept, tagged statements and a cluster of participants, for new information or concepts that negate at least one slant that is not in agreement with the goal; and
    injecting the new information into the deliberation at a rate determined by a degree of negation of the new information or concepts toward the goal, wherein the degree of negation is updated after each injection of the new information and wherein the rate of injection is selected to maintain a rate of convergence to the goal.

9. The computer program product of claim 8, wherein the injection is individualized to each group participant.

10. The computer program product of claim 8, wherein the injection is presented using a display.

11. The computer program product of claim 10, further comprising reducing an oscillation in the deliberation by updating the degree of negation.

12. The computer program product of claim 8, further comprising amplifying information or concepts that support the goal during a search.

13. The computer program product of claim 8, further comprising ranking, during a search, a salience of the at least one concept based on the support of the goal.

14. The computer program product of claim 8, further comprising ranking, during a search, a salience of the new information based on the support of the goal.

15. The computer program product of claim 8, further comprising scoring a serendipity of the new information based on correlation to the goal.

16. The computer program product of claim 15, further comprising searching for a serendipity concept in a topic space based on a measure of orthogonality from a plurality of topics discussed in the deliberation.

* * * * *